(12) United States Patent
Timbs (10) Patent No.: US 10,474,691 B2
(45) Date of Patent: Nov. 12, 2019

(54) MICRO-STAGING DEVICE AND METHOD FOR MICRO-STAGING

(75) Inventor: Jeffrey L. Timbs, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 1105 days.

(21) Appl. No.: 13/481,064

(22) Filed: May 25, 2012

(65) Prior Publication Data

US 2013/0318194 A1    Nov. 28, 2013

(51) Int. Cl.

| G06F 12/0862 | (2016.01) |
| G06F 16/25 | (2019.01) |
| G06F 9/38 | (2018.01) |
| G06F 9/30 | (2018.01) |
| G06F 16/172 | (2019.01) |

(52) U.S. Cl.
CPC ........ *G06F 16/252* (2019.01); *G06F 9/30047* (2013.01); *G06F 9/3802* (2013.01); *G06F 9/383* (2013.01); *G06F 9/3814* (2013.01); *G06F 12/0862* (2013.01); *G06F 16/172* (2019.01)

(58) Field of Classification Search
CPC .......... H04L 29/0881; H04L 29/08819; H04L 29/089; G06F 16/252; G06F 16/172; G06F 9/30047; G06F 9/3802; G06F 9/3814; G06F 9/383; G06F 12/0862
See application file for complete search history.

(56) References Cited

U.S. PATENT DOCUMENTS

| 6,874,017 | B1 * | 3/2005 | Inoue et al. .................. 709/217 |
| 7,610,365 | B1 * | 10/2009 | Kraft et al. ................... 709/223 |
| 7,912,063 | B2 |  3/2011 | Lu |
| 8,320,916 | B2 * | 11/2012 | Cortes ................. H04L 67/2847 455/436 |
| 2002/0062384 | A1 * | 5/2002 | Tso .................... G06F 17/30902 709/229 |
| 2002/0186899 | A1 * | 12/2002 | Bohnenkamp ................ 382/305 |
| 2003/0153338 | A1 * | 8/2003 | Herz ....................... H04W 4/029 455/517 |
| 2003/0187984 | A1 * | 10/2003 | Banavar et al. .............. 709/225 |
| 2003/0198346 | A1 * | 10/2003 | Meifu ..................... G06Q 30/02 380/258 |
| 2004/0064642 | A1 * | 4/2004 | Roskind ......................... 711/118 |
| 2005/0102300 | A1 * | 5/2005 | Madsen .......................... 707/100 |
| 2005/0125553 | A1 * | 6/2005 | Wu et al. ....................... 709/233 |

(Continued)

FOREIGN PATENT DOCUMENTS

| WO | WO 2010121205 A1 * | 10/2010 | ............ H04W 28/08 |
| WO | WO 2010121205 A9 * |  5/2011 | ............ H04W 28/08 |

OTHER PUBLICATIONS

Aline Baggio. Adaptable and Mobile-Aware Distributed Objects. Jun. 2, 1999, Paris. 274 pages.*

(Continued)

*Primary Examiner* — Le H Luu (74) *Attorney, Agent, or Firm* — Prol Intellectual Property Law, PLLC; H. Kenneth Prol (57) ABSTRACT

A micro-staging device has a wireless interface module for detecting a first data request that indicates a presence of a user and an application processor that establishes a network connection to a remote data center. The micro-staging device further allocates a portion of storage in a cache memory storage device for storing pre-fetched workflow data objects associated with the detected user.

20 Claims, 6 Drawing Sheets (56) References Cited

U.S. PATENT DOCUMENTS

| | | | |
|---|---|---|---|
| 2005/0132049 A1* | 6/2005 | Inoue | G06F 17/3087 709/225 |
| 2006/0029074 A2 | 2/2006 | Bauer | |
| 2007/0089110 A1* | 4/2007 | Li | 717/178 |
| 2007/0198674 A1* | 8/2007 | Li | H04L 67/02 709/217 |
| 2008/0037442 A1 | 2/2008 | Bill | |
| 2009/0222453 A1* | 9/2009 | Naineni | 707/10 |
| 2009/0275346 A1* | 11/2009 | Bauman et al. | 455/456.2 |
| 2009/0291696 A1* | 11/2009 | Cortes | H04L 67/2847 455/466 |
| 2010/0017863 A1* | 1/2010 | Chung | G06F 8/60 709/231 |
| 2010/0185753 A1 | 7/2010 | Liu et al. | |
| 2011/0065424 A1 | 3/2011 | Estevez et al. | |
| 2011/0225311 A1* | 9/2011 | Liu et al. | 709/231 |
| 2012/0057456 A1* | 3/2012 | Bogatin | H04W 28/08 370/230.1 |
| 2012/0191862 A1* | 7/2012 | Kovvali et al. | 709/227 |
| 2012/0290727 A1* | 11/2012 | Tivig | 709/227 |
| 2013/0054729 A1* | 2/2013 | Jaiswal | H04W 4/02 709/213 |

OTHER PUBLICATIONS

Stathes Hadjiefthymiades and Lazaros Merakos. "Using Proxy Cache Relocation to Accelerate Web Browsing in Wireless/Mobile Communications". In "Proceedings of the 10th international conference on World Wide Web". pp. 26-35. 2001 (month unknown).*

"Benefits of virtualizing an application server onto Xenapp" by Datapimp et al. Jul. 15, 2010-Dec. 19, 2010. 3 pages. Available online: http://serverfault.com/questions/160866/benefits-of-virtualizing-an-application-server-onto-xenapp.*

Aline Baggio, Guillaume Pierre. "Oléron: Supporting Information Sharing in Large-Scale Mobile Environments". Proceedings of the ERSADS Workshop, Mar. 1997. 5 pages.*

Pralhad Deshpande, Anand Kashyap, Chul Sung, and Samir R. Das. "Predictive Methods for Improved Vehicular WiFi Access". Proceedings of the 7th international conference on Mobile systems, applications, and services. Jun. 22-25, 2009, Krakow, Poland. pp. 263-276.*

* cited by examiner

MICRO-STAGING DEVICE AND METHOD FOR MICRO-STAGING

FIELD OF THE DISCLOSURE

The present disclosure generally relates to a method and device for a micro-staging device and method for use with a remote data center.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, and networking systems. Information handling systems can also implement various virtualized architectures. Data communications among information handling systems may be via networks that are wired, wireless, or some combination.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
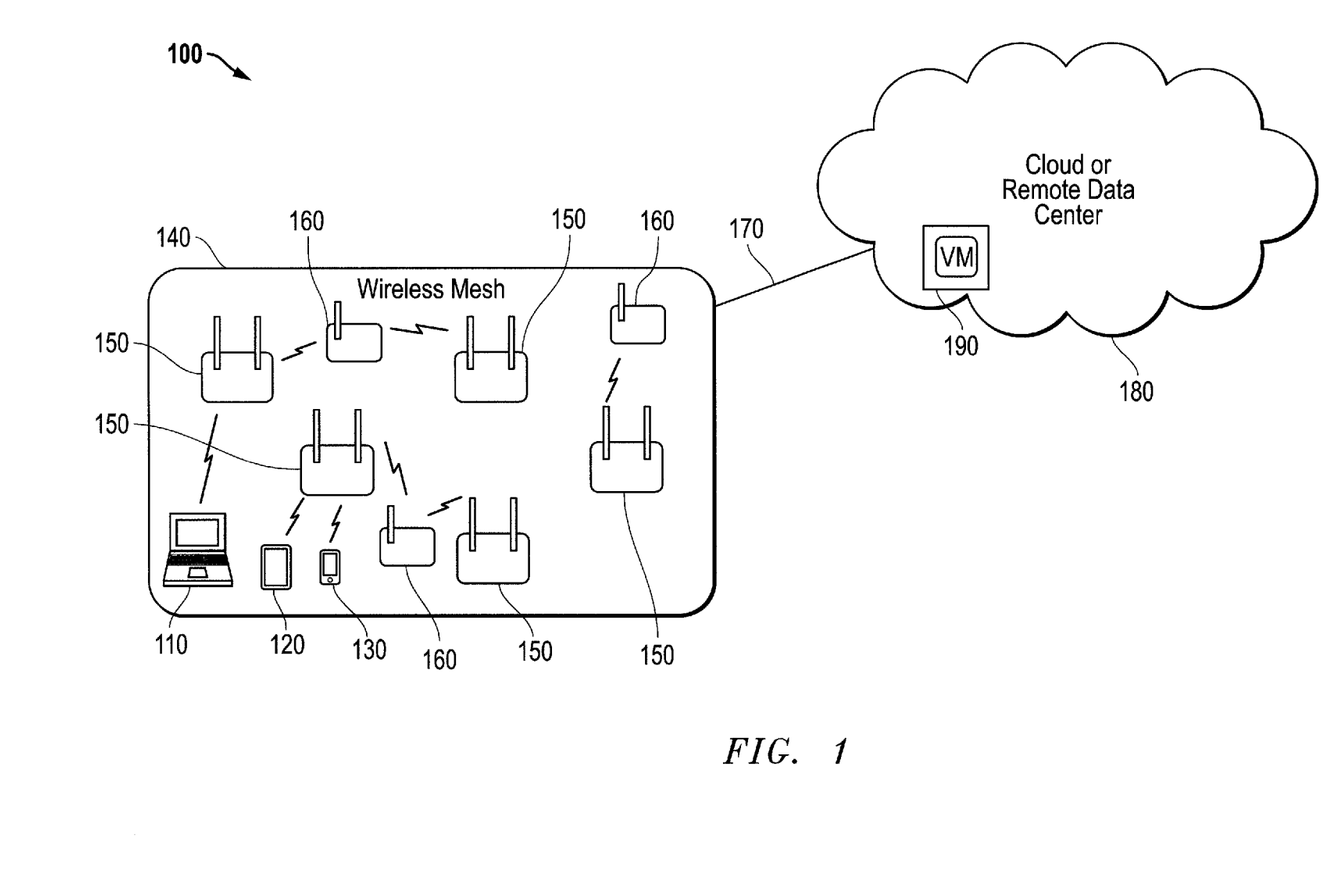
FIG. 1 is a block diagram of a network containing micro-staging devices according to an embodiment of the present disclosure.

FIG. 1 illustrates a network 100 that can include one or more information handling systems. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic, and operates to execute code. Additional components of the information handling system may include one or more storage devices that can store code, one or more communications ports for communicating with external devices as well as various input and output (I/O) devices, such as a keyboard, a mouse, and a video display. The information handling system may also include one or more buses operable to transmit communications between the various hardware components.

In a particular embodiment, network 100 includes networked information handling systems 110, 120 and 130, wireless network access points 150, micro-staging devices 160, and a connection 170 to an external network. Systems 110, 120, and 130 represent a variety of computing resources of network 100 including client information handling systems, data processing servers, network storage devices, local and wide area networks, or other resources as needed or desired. As specifically depicted, systems 110, 120, and 130 may be a laptop computer, tablet computer, or smartphone device. These user information handling systems 110, 120, and 130, along with the wireless network access points 150 and the micro-staging devices 160 may comprise a wireless network 140. For example, the wireless network may be the WLAN at an enterprise. Components of the WLAN may be connected by wireline or Ethernet connections. For example, the wireless network access points 150 may be connected to a wireless network controller and an Ethernet switch. The micro-staging devices may be connected to the wireless network access points by the Ethernet connection via, for example, an Ethernet switch.

The external network may contain externally accessible computing resources at a remote data center or cloud data center 180. Connectivity between the wireless network 140 and remote data center 180 may be via Ethernet or another similar connection to the world-wide-web, a WAN, a LAN, another WLAN, or other network structure. Such a connection 170 to the external network may be made via a backhaul connection to one or more wireless access points 150 or via a backhaul connection directly to one or more micro-staging devices 160 within the wireless network 140. Remote data centers or resources within a cloud environment may include client information handling systems, data processing servers, network storage devices, local and wide area networks, or other resources as needed or desired. Having such remote capabilities permits fewer resources to be maintained at the client systems 110, 120 and 130 allowing streamlining and efficiency within those devices. Similarly, remote data center or cloud data center 180 permits fewer resources to be maintained in other parts of network 100.

To communicate within the network 100, the systems 110, 120 and 130 each have a wireless interface module or wireless adapter, hereinafter referred to as a wireless adapter. System 110 includes a wireless adapter, system 120 includes a wireless adapter, and system 130 includes a wireless adapter. The wireless adapters are operable to provide a wireless radio frequency data interface to transmit and receive data between the respective systems 110, 120, and 130 and one or more external networks via wireless network 140. As such, the wireless adapters can represent add-in cards, or wireless network interface modules that are integrated with a main board of respective systems 110, 120, and 130 or integrated with another wireless network interface capability, or any combination thereof. Each of the wireless adapters for client information handling systems 110, 120, and 130 are uniquely identified on network 100 via one or more unique identifiers. For example, the wireless adapters can each be identified by one or more of a media access control (MAC) address, an Internet protocol (IP) address, a world wide name (WWN), or another unique identifier such as a user name and password, as needed or desired. Association of a user and a wireless interface module of a user information handling system may be made via communications across a networking control plane. For example, a user information handling system may be associated with a user via communication with a database such as Active Directory or similar database. This database may reside in the local wireless network 140 or may reside elsewhere in the external network.

The wireless adapters may operate in accordance with any wireless data communication standards, including IEEE 802.11 WLAN standards, IEEE 802.15 WPAN standards, IEEE 802.16 WMAN standards, cellular standards, or similar wireless standards. The wireless network 140 may have a wireless mesh architecture in accordance with mesh networks described by the above wireless data communications standards or similar standards. The wireless data communication standards set forth protocols for access point 150 communications and routing protocols, as well as protocols for a variety of other operations. This may include protocols for handoff of client devices moving between nodes, self-organizing routing operations, or self-healing architectures in case of interruption.

The cloud or remote data center 180 may run hosted applications for systems 110, 120, and 130. This may occur by establishing a virtual machine application 190 executing software to manage applications hosted at the remote data center 180. Systems 110, 120, and 130 are adapted to run one or more applications locally, and to have hosted applications run in association with the local applications at a cloud or remote data center 180. Virtual machine application 190 may serve one or more applications to each of user information handling systems 110, 120 and 130. Thus, as illustrated, systems 110, 120, and 130 may be running applications locally while requesting data objects related to those applications via wireless network from the remote data center 180. For example, an electronic mail client application may run locally at system 110. The electronic mail client application may be associated with a host application that represents an electronic mail server. In another example, a data storage client application such as Microsoft Sharepoint may run on system 120. It may be associated with a host application running at remote data center 180 that represents a Sharepoint data storage server. In a further example, a web browser application may be operating at system 130. The web browser application may request web data from a host application that represents a hosted website and associated applications running at remote data center 180.

FIG. 1 illustrates the micro-staging devices 160 shown dispersed within wireless network 140. The micro-staging device may be its own appliance with its own form factor, or it may be part of a form factor for a wireless access point 150. The micro-staging device 160 form factor may include an anti-tamper design to protect access to data similar to what would be implemented with a wireless access point 150. The micro-staging devices 160 may be dispersed within wireless network 140 on a one to one ratio with the wireless access points 150. However in the embodiment shown in FIG. 1, there are fewer micro-staging devices than access points 150 in the wireless network 140. Each micro-staging device 160 services an area containing one or more wireless access points 150 within a wireless network such as a WLAN. The area serviced by a micro-staging device is a fairly discrete area referred to as a traffic area. It may be an office area with many offices or cubicles or it may be one or more conference rooms. The traffic area may be defined by workspaces and meeting areas of the users of those traffic areas. The wireless network or WLAN 140 may serve a wider organization such as an enterprise campus. Several traffic areas may exist within the greater wireless network 140.

Figure 2:
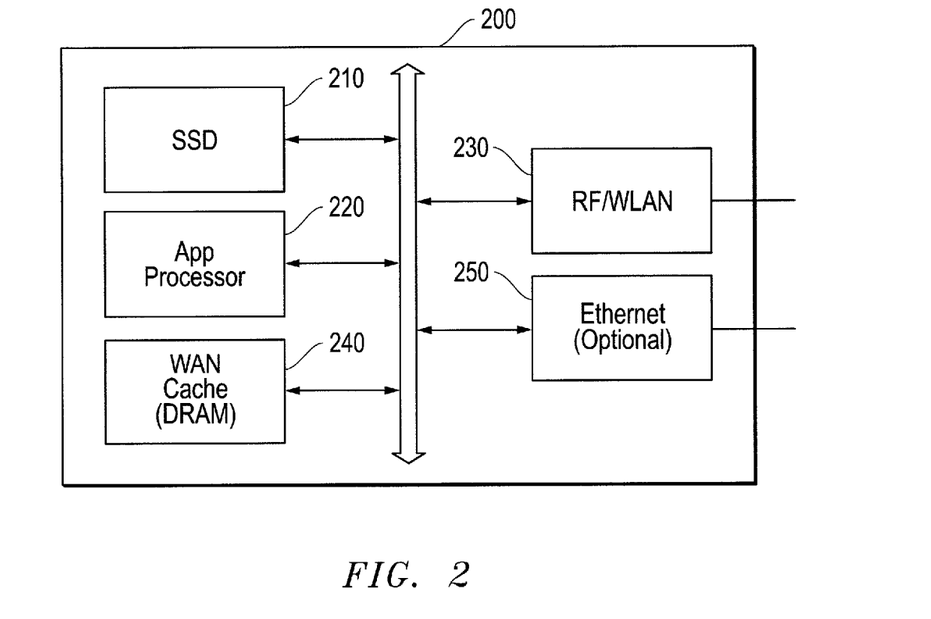
FIG. 2 is a block diagram of one of the micro-staging devices according to an embodiment of the present disclosure.

FIG. 2 illustrates an example embodiment of micro-staging device 200. The micro-staging devices 200 of the present embodiment are designed as a local or nearby micro-cache device intended to serve individual users. The micro-staging device intelligently pre-fetches data from a remote data center that will be of interest to the individual user according to a policy. This policy is referred to as a contextual policy and is specific to a user's information handling system. This contextual policy may be user-defined, or alternatively it may be designed to anticipate ongoing needs of the individual user of a client information handling system in traffic area based on purely contextual factors. The virtual machine pre-fetch application at the remote data center implements instructions to assess either or both user defined requirements and contextual inputs to determine pre-fetched data to be cached locally by the micro-staging device. The micro-staging device has a memory device 210, such as a solid state drive (SSD), within which it may allocate space to store pre-fetched data. In an alternative embodiment, memory device 210 may be a hard disk drive, an all-flash module, or a solid state drive. The allocation of memory device 210 is controlled by an application processor 220 and depends upon a signal or data request indicating that a user client information handling system is present in a traffic area served by the micro-staging device. The applications processor may be an ASIC, RISC, a micro-controller or even may utilize a broader CPU-based microprocessor. The applications processor is designed to execute instructions to operate the micro-staging device. By way of example, a general purpose ARM processor connected to the components of the micro-staging device via a bus may be used.

The micro-staging device 200 includes a wireless adapter 230 for communicating to the wireless access points 150, other micro-staging devices 160, or client systems 110, 120, and 130 within wireless network 140 shown in FIG. 1. The wireless adapter 230 may utilize wireless standards protocols as described above to communicate within the wireless network 140. Upon receiving communications from a client system 110, 120, or 130 for uplink of data to the external network, the micro-staging device 200 has a buffer cache 240 for control of data flow to the external network. In the embodiment shown in FIG. 2, buffer 240 is a WAN DRAM cache.

If the micro-staging device serves as a backhaul connection to the external network and the remote data center, the micro-staging device may include an Ethernet or other network interface 250. In an example embodiment, the micro-staging device may serve as one of the connection points between a wireless mesh network and the external network or networks.

In an alternative embodiment, the micro-staging device 200 may connect to the wireless network access points via wireline connection using the network interface 250 (not shown). For example, this may be an Ethernet connection to a wireless network controller. The micro-staging device may connect to the wireless network controller through with an Ethernet switch. The Ethernet switch may also provide connection to the external WAN network.

Figure 3:
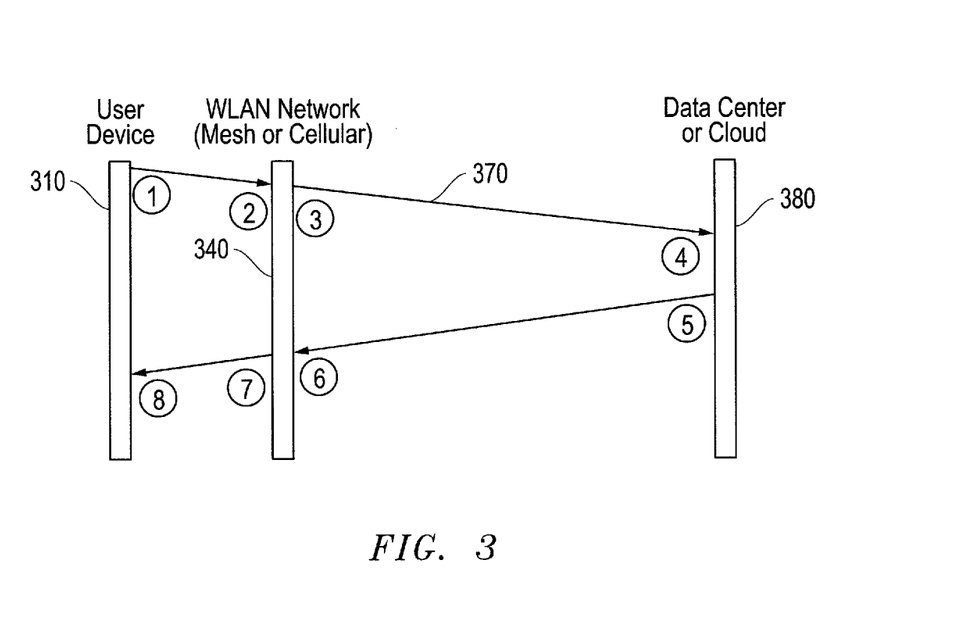
FIG. 3 is a flow diagram illustrating a method of data exchange between a user information handling system and a data center via a wireless network.

FIG. 3 illustrates a typical connection between a user information handling system 310 located in a wireless network 340 and a remote data center 380. Steps 1-8 depicted in FIG. 3 relate to the steps for exchange of files, requests, or data objects between user information handling system 310 and remote data center 380. In the example at step one, the user information handling system 310 requests data. In step two, the user device accesses the wireless network or WLAN 340. The wireless adapter of the user information handling system 310 communicates via an access point device within the wireless network. A user accessing the network may experience latency or time delay based on multi-user sharing and resource loading of the wireless network 340. At step three, the wireless network forwards the request via a backhaul connection to the external network and then to the remote data center or cloud 380. The request may be forwarded through a variety of networks 370 before arriving at the remote data center or cloud 380. These may include other WLAN, LAN, or WAN networks. At step 4, the request is received at the data center or cloud. This may take 50-300 ms per file, data object, or request. The request is serviced at the data center or cloud and a file, data object, or request is prepared to respond. At step five, the file, data object, or request is returned from the remote data center or cloud 380. It will pass through a similar external network 370 to return to the wireless network 340. At step six, the file, data object, or request is received by the backhaul access and processed at the wireless network 340 by a node or nodes therein. Further at step 6, the shared wireless network, for example the enterprise WLAN, may buffer the response according to availability of radio resources and traffic on the multi-user shared network. At step seven, the file, data object, or request is forwarded to the user information handling system 310. At step eight, the file, data object, or request is received by the user information handling system.

The present disclosure provides for a micro-staging system to enable micro-caching of pre-fetched data for an individual user at a location closer to the location of the user information handling system. In this way, long latency round-trip times between a mobile user information handling system and data in a remote data center or cloud may be reduced as it appears to the user. Intelligent selection of and local caching of preferred or relevant data to a user before it is requested, referred to as pre-fetched workflow data, will permit such an decrease in response time. Take the case of an enterprise campus with a WLAN for example. Users within an enterprise campus environment frequently roam away from fixed locations while using mobile information handling systems to communicate with the wireless network or WLAN. Compounding performance issues, many enterprise applications and related data are stored remotely from the enterprise campus and its users in a remote data center or with cloud computing resources. Round-trip latency times are imposed by the link 370, generally a WAN, between the wireless network 340 and the remote data center 380. Round-trip latency times are also imposed by the wireless network 340, such as the enterprise mesh network WLAN. WLAN resources are shared by users and concurrent data traffic can slow the responsiveness of the campus WLAN. Battery power of mobile user information handling systems is also adversely affected by the long latency round-trip time to receive responsive data. Longer waits by user information handling systems require more "on-air" time for these mobile devices and drains battery life. Caching user-specific data in or near the traffic area can optimize user information handling system communications and operation.

Figure 4:
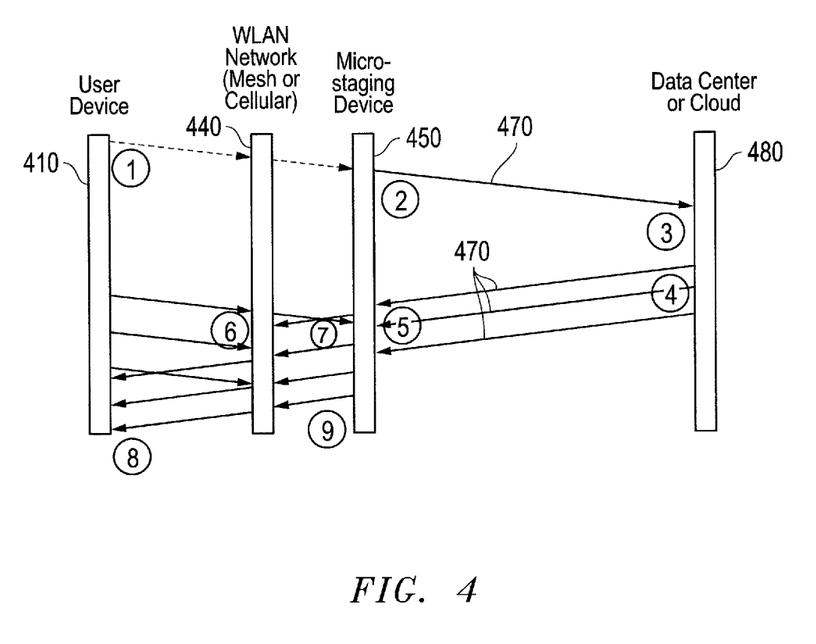
FIG. 4 is a flow diagram illustrating a method of data exchange between a user information handling system and a data center via a wireless network and a micro-staging device according to an embodiment of the present disclosure.

FIG. 4 depicts an embodiment of a connection between a user information handling system 410 located in a wireless network 440 and a remote data center 480 using a micro-staging device 450. Steps 1-8 depicted in FIG. 4 relate to the steps for exchange of files, requests, or data objects between user information handling system 410 and remote data center 480 via the micro-staging device 450. In this embodiment at step one, the user information handling system 410 is detected in the traffic area served by the micro-staging device 450. Detection by the micro-staging device may occur via a received request for data (triggering pre-fetch of related data), or may occur upon receipt of a registration packet when a user information handling system roams into a traffic area, or may occur upon receipt of a registration message received directly from a WLAN controller having detected the user information handling system 410. Each wireless access point may associate a user information handling system for example via interaction with a Microsoft Active Directory identification of a user information handling system by the wireless controller at an access point. In another embodiment, a user must log-in and be validated before a session is created. The session is maintained when roaming among access points via wireless network protocols such as those described above. Such session information may be accessed and used by the micro-staging device 450 as well to identify a user information handling system 410. A MAC address is associated with the user information handling system and may be tied to the user. Having this, remotely-stored user data may be associated with that user as well.

In step two, the micro-staging device 450 commences to pre-fetch data according to the contextual policy and user-defined policies set up at the remote data center or cloud 480. The policies may be established by a user or network administrator beforehand and transmitted to the remote data center or cloud. The wireless adapter of the micro-staging device 450 may communicate to the remote data center via an access point device within the wireless network or may communicate via its own Ethernet network interface. A pre-fetch request is sent to the remote data center or cloud 480 and may include at least identification of the user information handling system detected 410. The pre-fetch request may also identify a project associated with any first data request or via a registration packet or message from the user-information handling system 410. In one embodiment, the pre-fetch request is communicated to a virtual machine pre-fetch application operating at the remote data center or cloud 480. The wireless network 440 or micro-staging device 450 forwards the request via a backhaul connection to the external network 470 and then to the remote data center or cloud 480. The pre-fetch request, along with any initial data request, may be forwarded through a variety of networks 470 before arriving at the remote data center or cloud 480. These may include other WLAN, LAN, or, general WAN networks.

At step 3, the request is received at the data center or cloud 480. In one embodiment, the virtual machine pre-fetch application applies the contextual policy and user-defined policies to select pre-fetch data objects to be delivered to the micro-staging device 450. This may be based on a number of factors defined by a user for the contextual policy. In a user-defined contextual policy, explicit requirements may be set forth for certain objects to be pre-fetched. The virtual machine pre-fetch application queries the stored data objects according to policy factors and selects data objects to be pre-fetched. This may include limitations such as forwarding only new objects associated with a project or application that is running on the user information handling system 410. Data objects associated with a project or application are queried for recently received or changed versions. Alternatively, levels of importance may be pre-assigned to data objects associated with an application or working project. In another embodiment of a user-defined policy, data objects may be pre-selected by author. In yet another explicit user-defined policy factor, only newer data objects such as those authored within a specified time range may be selected to be pre-fetched from a shared application or project.

Pre-fetched data may be selected based on contextual policy factors assessed and determined by the virtual machine pre-fetch application. For example, if the project or application is identified by an initial data request from the user information handling system 410, then the contextual policy may direct the virtual machine pre-fetch application to pre-fetch all data objects related to that project or application. Alternatively, an active project may be identified within a user information handling system registration packet or registration message received by the micro-staging device 450. In this case, the virtual machine pre-fetch application may select data objects identified with a project. The relationship of data objects to projects may be via meta-data associated with data objects. For example, data objects may be identified in a Sharepoint data storage application via Sharepoint meta-data.

Another contextual factor that may trigger pre-fetch of data objects is the detection of a calendared meeting associated with a project or application by the virtual machine pre-fetch application. The virtual machine pre-fetch application at the remote data center 480 may have access to the user calendar and query that data upon receipt of a pre-fetch request associated with the user information handling system 410. The calendar data or metadata may indicate which project or application relates to the meeting. The virtual machine pre-fetch application then pre-fetches associated data objects.

Another example contextual factor may include detection by the virtual machine pre-fetch application at the remote data center 480 of the presence of several user information handling systems 410 associated with a project or application. Upon detection of multiple user-information handling systems 410 being serviced by micro-staging device 450, the virtual machine pre-fetch application may determine to pre-fetch workflow data associated with the common project or application for each of the detected user information handling systems 410. Then pre-fetched data objects associated with this project or application are selected by the virtual machine pre-fetch application and pushed to the allocated portions of cache in the micro-staging device 450. The contextual policy may be set to trigger pre-fetch of data objects with the presence any number of user information handling systems 410 detected in the traffic area of a micro-staging device 450. It may be only one user information handling system associated with a project. Generally, any percentage of information handling systems detected in a given traffic area associated with a project may trigger pre-fetch of workflow data. For example, if a traffic area is a conference room where regular meetings take place, a majority of user-information handling systems associated with an identified project may trigger pre-fetch of project workflow data. If instead the traffic area is a general office or cubicle environment servicing several offices, then a lower percentage is likely to be selected to trigger selection of pre-fetched objects.

Alternatively, the virtual machine pre-fetch application may query calendar data of user information handling systems in a traffic area to determine if a common meeting is scheduled. The calendar data may indicate relevant projects or applications and the virtual machine pre-fetches associated data objects for each user. In a further example of a contextual policy factor, the virtual machine pre-fetch application at the remote data center 480 may track work flow history of the user information handling system. If this contextual policy factor applies, data objects may be pre-fetched based on the virtual machine pre-fetch application or a virtual desktop tracking which projects or applications have data most frequently requested by the user during a defined time period. Workflow data associated with the more frequently accessed projects or applications will be pre-fetched.

Any one or more of the contextual factors above, including user-defined factors, may be applied to select pre-fetched data objects. The contextual factors may vary in importance or order in which they are applied, although in the described embodiment user-defined contextual factors are likely to take precedence. If specific data is not explicitly called out for pre-fetching by the user a heuristic approach may be used. A heuristic analysis by the virtual machine pre-fetch application may be used to assess the chances that certain stored data will be used by implementing the contextual policy factors.

At step four of FIG. 4, the virtual machine pre-fetch application running at the remote data center pushes several pre-fetched data objects from the remote data center or cloud 480 to the micro-staging device 450. Since the system may receive an initial data request from the user information handling system to trigger pre-fetching, data objects, files, or requests responsive to any initial data request will also be returned but to the user information handling system directly 410. Pre-fetched data objects will pass through a similar external network 470 to return to the micro-staging device 450.

At step five, the pre-fetched data objects are received by the micro-staging device 450 and stored in an allocated storage location. Responsive files, data objects, or requests to any initial data requests are processed at the wireless network 440 by the backhaul access node or the micro-staging device therein and returned to the user information handling system 410. Further at step five, the micro-staging device 450 may buffer the response to any initial data request according to availability of radio resources and traffic on the multi-user shared wireless network 440.

At step six, a subsequent data request is issued from a user information handling system 410 via the wireless network. At step seven, the subsequent data request from the user information handling system 410 is intercepted and received at the micro-staging device 450. Any subsequent data requests from user information handling system are serviced directly from the allocated storage of the micro-staging device 450. Because the micro-staging device is local, the round-trip time through the WAN 470 is avoided. By pre-fetching data ahead of time, the data to be requested is closer to the user information handling system. 410. The communication performance as perceived at the user information handling system 410 will be improved. A lower latency period for pre-fetched data will be perceived at the user information handling system. The pre-fetching happens in the background from the remote data center 480 and does not occupy user information handling system resources such as processor time or memory while the pre-fetch occurs. At step eight, the file, data object, or request is received at the user information handling system 410 from the micro-staging device 450.

At step nine, the user information handling system 410 may move away from the traffic area. In that case, the user's pre-fetched data is ejected from the micro-staging device 450 and the storage space is made available to re-allocate to a new user information handling system.

Figure 5:
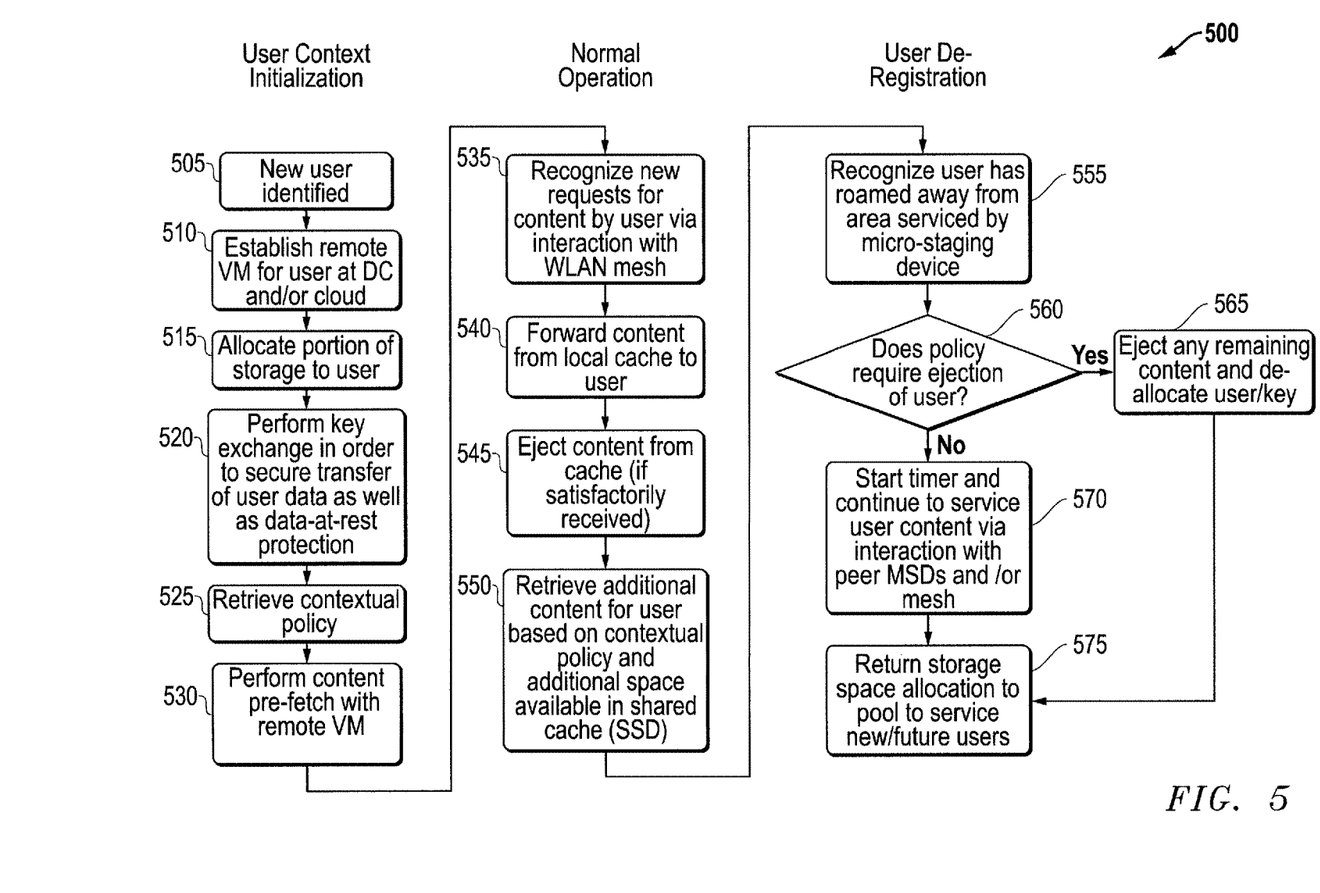
FIG. 5 is a flowchart illustrating a method according to an embodiment of the present disclosure.

FIG. 5 shows a method 500 in accordance with an embodiment of the present disclosure for a micro-staging process flow embodiment. The method 500 generally describes user context initialization via a virtual machine pre-fetch application at the remote data center or cloud for pre-fetching data objects, normal operation of the micro-staging device to service requests, and user de-registrations. In the embodiment of method 500, the flow is depicted in a particular order, however the method to pre-fetch data may be occur in any order and the disclosure is not limited to the order shown in 500.

The flow begins at block 505 where a new user information handling system is detected in the traffic area of the micro-staging device. As described above with respect to FIG. 4, this may be via receipt of an initial data request from the user information handling system. In the alternative, detection of the user information handling system may come via receipt of a registration packet upon arrival in the traffic area or via receipt of a registration message from the WLAN controller. This user information handling system identification is received by the micro-staging device and forwarded to and received by the remote data center.

The flow proceeds to block 510 where the remote data center establishes a virtual machine pre-fetch application or initiates a pre-existing virtual machine pre-fetch application to manage pre-fetching data and communicating with the micro-staging device. The virtual machine pre-fetch application operates to manage the pre-fetching for the detected user information handling system located in the traffic area. The virtual machine pre-fetch application may recognize a request related to an application or project serviced by the virtual machine. This recognition may happen for example via an Active Directory match between the user information handling system and the virtual machine pre-fetch application at the remote data center or cloud. In this example, the virtual machine pre-fetch application may identify that it serves a given application or project, then the virtual machine pre-fetch application can discern the appropriate application programming interface to access and authenticate the user via the Active Directory match. Alternatively, an application may be commenced within a remote desktop at the remote data center that is associated with the identified user information handling system.

In the present embodiment, one virtual machine pre-fetch application is described as servicing a micro-staging device however, more than one virtual machine pre-fetch application at different locations is also contemplated to service a micro-staging device. Likewise, multiple micro-staging devices may be serviced by a single virtual machine pre-fetch application, or by multiple virtual machine pre-fetch applications.

In the presently described embodiment, the flow proceeds to block 515. At block 515, the micro-staging device application process allocates a portion of storage to the identified user information handling system. Since the storage at the micro-staging device is a resource utilized by multiple information handling systems present in a traffic area it is sometimes referred to as a shared cache. In an example embodiment, the shared cache is a solid-state memory device located in the micro-staging device. The allocation of the shared cache may be made equally among user information handling systems within the traffic area on a first-come, first-serve basis. Alternatively, the micro-staging device may tier the available shared cache space according to importance of the user. For example, the micro-staging device may receive instructions that one user is a project lead and requires a greater allocation of the shared cache at a given time. This information may come from the registration packet received from the user information handling system or may come from the virtual machine pre-fetch application implementing a contextual policy.

The flow proceeds to block 520. At block 520, the virtual machine pre-fetch application of the present embodiment and the micro-staging device set up security for the exchange of a user's workflow data. In the present embodiment, a security key exchange may take place to secure both the transfer of data across the WAN but also protect the data after it is stored in the micro-staging device shared cache. The security of the data using techniques such as encryption will prevent unauthorized access to data stored in the shared cache and inadvertent access as between user information handling systems sharing the micro-staging device cache.

The method proceeds to block 525. At block 525, the virtual machine pre-fetch application of the present embodiment retrieves the contextual policy governing the pre-fetch of the user's workflow data. Retrieval of the contextual policy will depend at least upon identification of the user information handling system. One or more factors from the retrieved contextual policy determine what data at a remote data center is pre-fetched. As described above, these factors may also be ranked by importance whereby one or more factors supersedes consideration of the other factors identified in the contextual policy.

At block 530, the virtual machine pre-fetch application performs a content pre-fetch of workflow data objects from the data store at the remote data center using the contextual policy. If a project is identified by an initial data request from the user information handling system or a scheduled project meeting for example, then workflow data associated with that project is pre-fetched. The pre-fetched data objects are then pushed down to the allocated cache in the micro-staging device for the identified user.

Next the flow proceeds to steps describing the micro-staging device servicing data requests from the allocated portion of shared cache. At block 535, the micro-staging device must recognize a new data request from the identified user information handling system. For example, this may occur via interaction with the WLAN mesh. By way of further example, the micro-staging device may sniff packets on the WLAN mesh to determine a data request from a user information handling system being serviced. Inspection of packet meta-data or even deep packet inspection may be used to determine that another data request is issued from the user information handling system. Pursuant to typical WLAN protocols, the micro-staging device may need to decrypt, re-encrypt data requests for inspection.

At block 540, the micro-staging device responds to the new data request from the user information handling system in the traffic area by forwarding responsive workflow data content from the allocated cache. If responsive workflow data content is not present in the micro-staging device shared cache, then the new data request is forwarded to the remote data center or cloud for service there. The system of the present embodiment infers that workflow data has been successfully sent after a window of time has expired. Optionally, the user information handling system will instead indicate whether the forwarded workflow data content has been successfully received. For example, if TCP/IP protocol is used to send data to the user information handling system, acknowledgments of each packet of the data object would be returned.

The method proceeds to block 545. At block 545, if the content is successfully received by the user information handling system, that content is then ejected from the allocated cache space for the user to make room for additional pre-fetched data. Proceeding to block 550, the micro-staging device retrieves additional pre-fetched content from the virtual machine pre-fetch application at the remote data center based on the space available in the shared cache. The virtual machine pre-fetch application will again implement the contextual policy to prepare new workflow data to be pushed to the micro-staging device. In most cases, previously pre-fetched data is eliminated from being sent again during this step of the method. Although not shown, if no more content is available to be pre-fetched, the micro-staging device may de-allocate the storage space. In this alternative embodiment, the micro-staging device storage space allocation is returned to the pool of available storage space for future users.

Next the method proceeds to steps describing an example of de-registration of a user. At block 555, the micro-staging device will recognize that the user information handling system has roamed away from the traffic area. This may come via a timing-out for the stored pre-fetched data not being served from the allocated portion of the shared cache. It may come from pinging of the user information handling system and failing to receive a response. The recognition may come from the detection of the same user information handling system in the traffic area of a different micro-staging device. Or it may come from the virtual machine pre-fetch application recognizing that the user information handling system is requesting data from a different location.

The method proceeds to block 560 where the application processor of the micro-staging device determines whether the contextual policy requires ejection of a user upon roaming away from the traffic area. If so, the method proceeds to block 565 where all remaining content is ejected from the shared cache of the micro-staging device. In addition, the micro-staging device de-allocates the storage space for the user and de-designates the security key. The method proceeds to block 575, where the micro-staging device returns the allocated storage space to a general pool of shared cache storage made available to service future users. If the policy does not require ejection of the user upon roaming away from the traffic area, the method proceeds to block 570. At block 570, the micro-staging device will start a timer and continue servicing user content. If the user information handling system returns to the roaming area before the timer expires, the timer will be suspended and the micro-staging device will continue with its normal servicing. During the timer period, the micro-staging device will service the user information handlings system via peer micro-staging devices within the wireless mesh network. In one embodiment, the micro-staging device will not retrieve new pre-fetched content upon serving the cached content. As before, successfully served content will be ejected from the shared cache. Upon timeout, the micro-staging device will eject any remaining content from the shared cache and de-allocate the user. Then the method will proceed to block 575 where the micro-staging device returns the allocated storage space to a general pool of shared cache storage made available to service future users.

Figure 6:
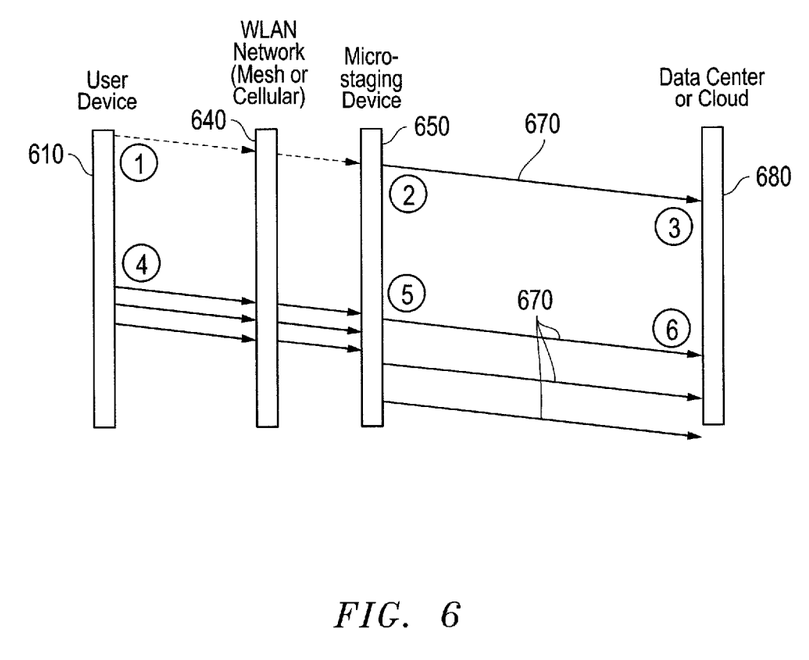
FIG. 6 is a flow diagram illustrating a method of data exchange between a user information handling system and a data center via a wireless network and a micro-staging device according to another embodiment of the present disclosure.

FIG. 6 illustrates another embodiment of the described method. FIG. 6 depicts an embodiment of backing up data as a user information handling system 410 roams into a traffic area of a micro-staging device 650. Steps 1-6 depicted in FIG. 6 relate to the automatic back-up of the user information handling system content at the remote data center or cloud 680. In this embodiment at step one, the user information handling system 610 is detected in the traffic area served by the micro-staging device 650. As described above, the detection by the micro-staging device may occur via a received request for data (triggering pre-fetch of related data), or may occur upon receipt of a registration packet when a user information handling system roams into a traffic area, or may occur upon receipt of a registration message received directly from a WLAN controller having detected the user information handling system 610. A local back-up application commences at the user info nation handling system 610. The local back-up application tracks which files are new or changed at the information handling system 610 while running in the background.

In step two, the micro-staging device 650 commences communication with a virtual machine application operating at the remote data center or cloud 680. The wireless adapter of the micro-staging device 650 may communicate to the remote data center via an access point device within the wireless network or may communicate via its own Ethernet network interface. The request to establish a connection with a virtual machine is sent to the remote data center or cloud 680 and may include at least identification of the detected user information handling system. The wireless network 640 or micro-staging device 650 forwards the request via a backhaul connection to the external network and then to the remote data center or cloud 680. The external network 670 may comprise a variety of networks 670 before arriving at the remote data center or cloud 680. These may include other WLAN, LAN, or general WAN networks.

Upon making this connection, at step three the virtual machine application commences a remote back-up application at the data center or cloud 680. This remote back-up virtual machine application may communicate with the micro-staging device 650 servicing the traffic area. The remote back-up virtual machine application also manages receiving the new or changed data to be backed-up and backing up that data within the remote data storage at the remote data center or cloud. This remote back-up virtual machine may be a component of the virtual machine that manages the pre-fetch operations, a component application of a remote desktop application, or an independent virtual machine application running at a remote data center.

At step four, the local back-up application running on the detected user information handling system backs up new or changed data and objects in the background directly over the WLAN wireless network 640 to the micro-staging device 650. The back-up data is cached at the micro-staging device in a storage device such as the SSD or WAN DRAM cache as depicted in FIG. 2. The micro-staging device 650 may acknowledge receipt of the back-up data and the user information handling system 610 participation is done.

At step five, the micro-staging device 650 sends the back-up data from its cache location to the data center or cloud 680. The back-up information is sent via an access point device backbone connection within the wireless network 640 or may be communicated via the micro-staging device's own Ethernet network interface. The back-up information is sent via WAN 670 to the data center or cloud 680. Since the user information handling system 610 was done communicating its back-up data at step four, it does not need to wait on a round trip time for transmitting data across the WAN 670 during step five. During the write-through of the back-up information to the remote data center or cloud 680, the user information handling system need not be involved. The user information handling system 610 may decouple after communicating its back-up data to the micro-staging device 650 and does not wait for the transfer to the remote data center 680. Communication may occur only between the micro-staging device 650 and the remote data center or cloud 680. The user information handling 610 may even roam away from the traffic area while the micro-staging device 650 completes the back-up information transfer across the WAN external network 670.

At step six, the remote back-up virtual machine application provides an affirmation to the micro-staging device 650 that data has been received and stored at the remote data center or cloud 680. Then the cache memory resource in the micro-staging device may be freed up to other purposes.

Figure 7:
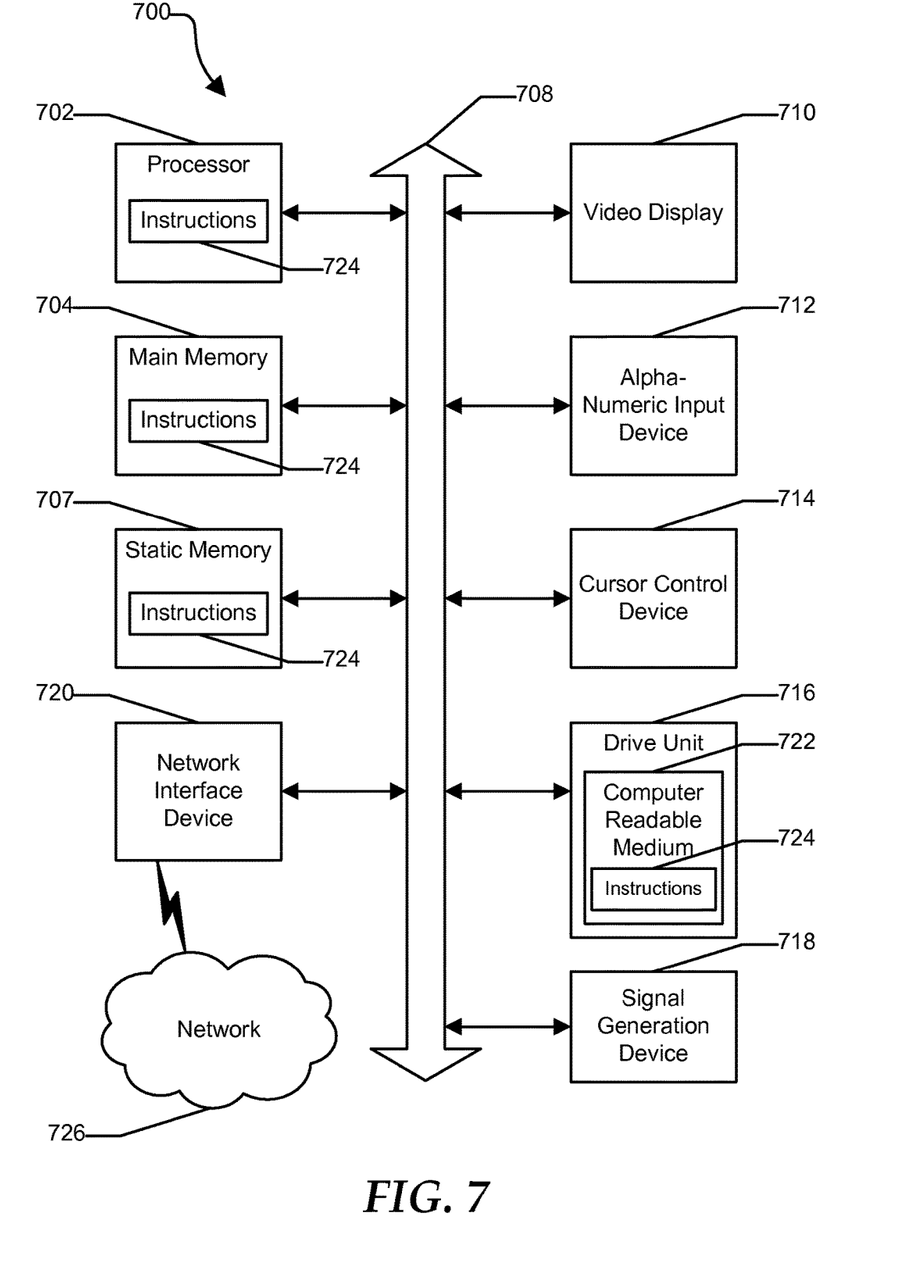
FIG. 7 is a block diagram illustrating an information handling system according to an embodiment of the present disclosure.

FIG. 7 shows an information handling system 700 capable of administering each of the specific embodiments of the present disclosure. The information handling system 700 can represent the user information handling systems 110, 120 and 130 or servers or systems located anywhere within network 100 of FIG. 1, including the remote data center or cloud 180 operating the virtual machine applications described herein. The information handling system 700 may include a processor 702 such as a central processing unit (CPU), a graphics processing unit (GPU), or both. Moreover, the information handling system 700 can include a main memory 704 and a static memory 707 that can communicate with each other via a bus 708. As shown, the information handling system 700 may further include a video display unit 710, such as a liquid crystal display (LCD), an organic light emitting diode (OLED), a flat panel display, a solid state display, or a cathode ray tube (CRT). Additionally, the information handling system 700 may include an input device 712, such as a keyboard, and a cursor control device 714, such as a mouse. The information handling system 700 can also include a disk drive unit 716, a signal generation device 718, such as a speaker or remote control, and a network interface device 720. The information handling system 700 can represent a server device whose resources can be shared by multiple client devices, or it can represent an individual client device, such as a desktop personal computer.

The information handling system 700 can include a set of instructions that can be executed to cause the computer system to perform any one or more of the methods or computer based functions disclosed herein. The computer system 700 may operate as a standalone device or may be connected such as using a network, to other computer systems or peripheral devices.

In a networked deployment, the information handling system 700 may operate in the capacity of a server or as a client user computer in a server-client user network environment, or as a peer computer system in a peer-to-peer (or distributed) network environment. The information handling system 700 can also be implemented as or incorporated into various devices, such as a personal computer (PC), a tablet PC, a set-top box (STB), a PDA, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single information handling system 700 is illustrated, the term "system" shall also be taken to include any collection of systems or sub-systems that individually or jointly execute a set, or multiple sets, of instructions to perform one or more computer functions.

The disk drive unit 716 may include a computer-readable medium 722 in which one or more sets of instructions 724 such as software can be embedded. The disk drive unit 716 also contains space for data storage. Further, the instructions 724 may embody one or more of the methods or logic as described herein. In a particular embodiment, the instructions 724 may reside completely, or at least partially, within the main memory 704, the static memory 707, and/or within the processor 702 during execution by the information handling system 700. The main memory 704 and the processor 702 also may include computer-readable media. The network interface device 720 can provide connectivity to a network 726, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal; so that a device connected to a network 726 can communicate voice, video or data over the network 726. Further, the instructions 524 may be transmitted or received over the network 726 via the network interface device 720.

Information handling system 700 includes one or more application programs 724, and Basic Input/Output System and Firmware (BIOS/FW) code 724. BIOS/FW code 724 functions to initialize information handling system 700 on power up, to launch an operating system, and to manage input and output interactions between the operating system and the other elements of information handling system 700. In a particular embodiment, BIOS/FW code 724 reside in memory 704, and include machine-executable code that is executed by processor 702 to perform various functions of information handling system 700. In another embodiment (not illustrated), application programs and BIOS/FW code reside in another storage medium of information handling system 700. For example, application programs and BIOS/FW code can reside in drive 716, in a ROM (not illustrated) associated with information handling system 700, in an option-ROM (not illustrated) associated with various devices of information handling system 700, in storage system 707, in a storage system (not illustrated) associated with network channel 720, in another storage medium of information handling system 700, or a combination thereof. Application programs 724 and BIOS/FW code 724 can each be implemented as single programs, or as separate programs carrying out the various features as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system can include memory (volatile (e.g. random-access memory, etc.), non-volatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A micro-staging device comprising:
   a wireless interface module in a mesh WLAN network and operatively coupled to a wireless access point in a physical wireless traffic area for detecting a first data request indicating a presence of a user information handling system in the physical wireless traffic area, wherein the micro-staging device serves the physical wireless traffic area including one or more wireless access points and the micro-staging device forming a portion of the mesh WLAN network associated with the micro-staging device and wireless range associated with that one or more wireless access points and the micro-staging device in the portion of the mesh WLAN network associated with the micro-staging device; and
   an application processor for establishing a network connection to a remote data center via a backhaul connection with the wireless access point and for pre-fetching workflow data from the remote data center based on a contextual policy;
   the application processor further allocating a portion of storage in a cache memory storage device for storing pre-fetched workflow data associated with the user information handling system; and
   the wireless interface module further adapted to transmit pre-fetched workflow data from the cache memory storage device at the micro-staging device in response to receiving a second data request from the user information handling system to reduce the burden of communications on the user information handling system to retrieve the pre-fetched workflow data from within the mesh WLAN network;
   wherein the workflow data pre-fetched according to the contextual policy are received from the remote data center based on identification of a project associated with the first data request.

2. The micro-staging device of claim 1, wherein the pre-fetched workflow data pre-fetched according to the contextual policy are received from the remote data center further based on an identification of a presence of another team member information handling system associated with the project in the physical wireless traffic area.

3. The micro-staging device of claim 1, wherein the application processor is further adapted to:
   establish a connection with a virtual machine pre-fetch application at the remote data center for executing the contextual policy to select pre-fetched workflow data.

4. The micro-staging device of claim 1, wherein the application processor is further adapted to:
   detect that the user information handling system is no longer present in the physical wireless traffic area;
   eject the stored pre-fetched workflow data; and
   de-allocate the portion of storage.

5. The micro-staging device of claim 1, wherein the application processor is further adapted to:
   store changed workflow data received from the user information handling system in the allocated storage and forward the changed work flow data to the remote data center for back-up upon receipt from the user information handling system.

6. The micro-staging device of claim 1, wherein the pre-fetched workflow data pre-fetched according to the contextual policy are received from the remote data center further based on identification of a calendared meeting for the project.

7. The micro-staging device of claim 1, wherein the physical wireless traffic area in the mesh WLAN network serves a physical area of up to two wireless link stages from the micro-staging device to the user information handling system via an intermediary wireless access point and its wireless range.

8. A method comprising:
   receiving at a micro-staging device in a mesh WLAN network and operatively coupled to a wireless access point in a physical wireless traffic area an indication of a presence of a user information handling system detected in the physical wireless traffic area, wherein the micro-staging device serves the physical wireless traffic area which includes one or more wireless access points and the micro-staging device forming a portion of the mesh WLAN network associated with the micro-staging device and wireless range associated with that one or more wireless access points and the micro-staging device in the portion of the mesh WLAN network associated with the micro-staging device;
   sending a command to a virtual machine pre-fetch application to provide pre-fetched workflow data according to a contextual policy at a remote data center via a backhaul network connection with the wireless access point;
   allocating a portion of storage at the micro-staging device for storing pre-fetched workflow data associated with the user information handling system;
   receiving pre-fetched workflow data from the remote data center;
   detecting a data request from the user information handling system; and
   transmitting responsive pre-fetched workflow data from the micro-staging device to the user information handling system to reduce the burden of communications on the user information handling system to retrieve the pre-fetched workflow data from within the mesh WLAN network;
   wherein the contextual policy determines workflow data to be pre-fetched by the virtual machine pre-fetch application and includes a user-defined instruction reflecting a policy to retrieve workflow data associated with an identified application.

9. The method of claim 8, wherein the contextual policy further includes a user-defined instruction reflecting a policy to retrieve only workflow data associated with the identified application newly received at the remote data center.

10. The method of claim 8, wherein the contextual policy determines the workflow data to be pre-fetched by the virtual machine pre-fetch application by further comprising:
    a command to retrieve workflow data to be pre-fetched by the virtual machine pre-fetch application and associated with a project upon occurrence of a calendared meeting for the project.

11. The method of claim 8, further comprising:
    ejecting any stored pre-fetched workflow data from the storage device upon detecting that the user information handling system has roamed away from the wireless traffic area.

12. The method of claim 11, further comprising:
de-allocating the portion of storage at the micro-staging device for storing pre-fetched workflow data.

13. The method of claim 8, further comprising:
ejecting any stored pre-fetched workflow data from the storage device upon delivery of the pre-fetched workflow data to the user information handling system in the wireless traffic area.

14. The method of claim 8, further comprising:
de-allocating the portion of storage at the micro-staging device for storing pre-fetched workflow data after allocating the portion of storage at the micro-staging device upon detecting that the user information handling system has timed-out before detecting a data request from the user information handling system.

15. A computer-implemented method for pre-fetching data for delivery to a micro-staging device, the method comprising:
receiving a contextual policy at a remote data center via a backhaul connection to a wireless access point in a mesh WLAN network to determine pre-fetching of workflow data stored at the remote data center;
receiving a pre-fetch request identifying a user information handling system from the micro-staging device in the mesh WLAN network that is operatively coupled to the wireless access point in a physical wireless traffic area, wherein the micro-staging device serves the physical wireless traffic area which includes one or more wireless access points and the micro-staging device forming a portion of the mesh WLAN network associated with the micro-staging device and wireless range associated with the one or more wireless access points and the micro-staging device in the portion of the mesh WLAN network associated with the micro-staging device;
associating the contextual policy with the user information handling system to be serviced by the pre-fetch request; and
transmitting workflow data in response to the pre-fetch request according to the contextual policy to the micro-staging device to reduce the burden of communications on the user information handling system to retrieve the pre-fetched workflow data from within the mesh WLAN network;
wherein the contextual policy determines the workflow data to be pre-fetched according to:
identification of a project associated with the pre-fetch request; and
identification of the workflow data associated with the project.

16. The computer-implemented method of claim 15, wherein the contextual policy further determines the workflow data to be pre-fetched according to a detected presence of another team member information handling system associated with the project in the wireless traffic area.

17. The computer-implemented method of claim 15, wherein the contextual policy further determines the workflow data to be pre-fetched according to an occurrence of a calendared meeting associated with the project.

18. The computer-implemented method of claim 15, wherein the contextual policy further determines the workflow data to be pre-fetched according to a user-defined command to deliver specified workflow data from a priority level.

19. The computer-implemented method of claim 15, the method further comprising:
receiving the pre-fetch request from the micro-staging device; and
receiving a first data request from the user information handling system via the micro-staging device;
wherein the first data request identifies the project associated with the pre-fetch request.

20. The computer-implemented method of claim 15, wherein the contextual policy further determines the workflow data to be pre-fetched according to a recent workstream history of the user information handling system.

* * * * *